US006434599B1

United States Patent
Porter

(10) Patent No.: US 6,434,599 B1
(45) Date of Patent: Aug. 13, 2002

(54) METHOD AND APPARATUS FOR ON-LINE CHATTING

(75) Inventor: Swain W. Porter, Kirkland, WA (US)

(73) Assignee: Xoucin, Inc., Kirkland, WA (US)

(*) Notice: Subject to any disclaimer, the term of this patent is extended or adjusted under 35 U.S.C. 154(b) by 0 days.

(21) Appl. No.: 09/409,767

(22) Filed: Sep. 30, 1999

(51) Int. Cl.[7] .............................................. G06F 13/00
(52) U.S. Cl. ........................ 709/204; 709/219; 709/329
(58) Field of Search ................................. 709/203, 204, 709/205, 206, 217, 219, 223, 225, 227, 313, 328, 329

(56) References Cited

U.S. PATENT DOCUMENTS

| 5,793,365 A | * | 8/1998 | Tang et al. ................. 345/329 |
| 5,796,393 A | * | 8/1998 | MacNaughton et al. .... 345/329 |
| 5,828,843 A | * | 10/1998 | Grimm et al. ............... 709/228 |
| 6,065,047 A | * | 5/2000 | Carpenter et al. .......... 709/218 |
| 6,081,830 A | * | 6/2000 | Schindler .................... 709/204 |

* cited by examiner

Primary Examiner—Viet D. Vu
(74) Attorney, Agent, or Firm—Columbia IP Law Group, PC

(57) ABSTRACT

Visitation by a first on-line user to an information page of an information site is facilitated. Dynamic formation of a chat session for the first on-line user and a second on-liner user to chat with each other is also facilitated. The chat session, through which the first and second on-line users chat with each other, is then facilitated. In one embodiment, the chat session including its dynamic formation are facilitated by the information site. In another embodiment, the chat session including its dynamic formation are facilitated by a third party chat server. In one embodiment, the second on-line user is also visiting the same information page. In another embodiment, the second on-line user is merely visiting the same information site. In yet another embodiment, the second on-line user is visiting another information site. In one embodiment, visit by the first on-line user to a new information page of another information site, during the chat session, is also facilitated. In another embodiment, coordinated visit by the second on-line user to the same new information page of the other information site, during the chat session, is also facilitated.

25 Claims, 11 Drawing Sheets

FIG. 6A

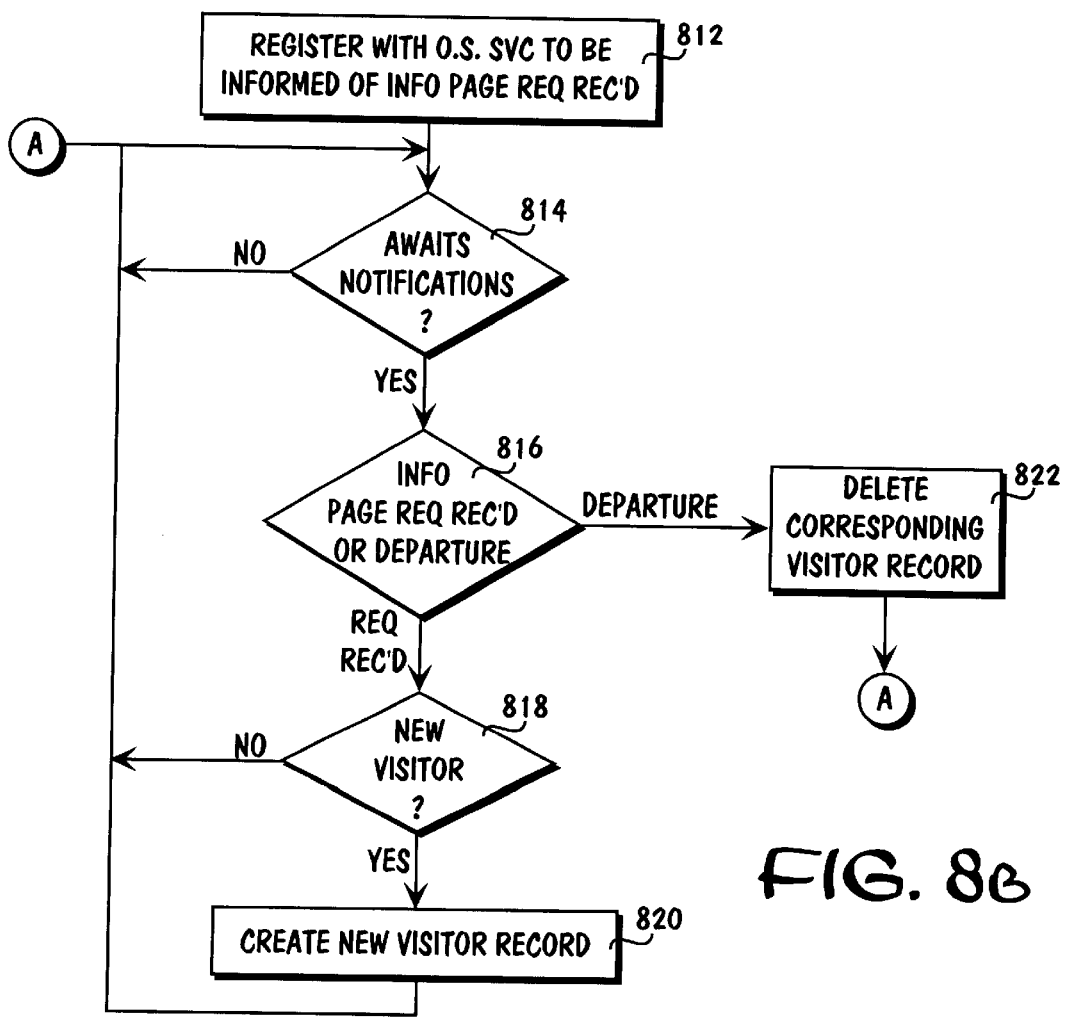

METHOD AND APPARATUS FOR ON-LINE CHATTING

BACKGROUND OF THE INVENTION

1. Field of the Invention

The present invention relates to the field of information systems. More specifically, the present invention relates to on-line chatting.

2. Background Information

Advances in computer technology have led to personalization of computers. Once reserved for large enterprises, computers have become affordable and available to the masses. Coupled that with advances in networking and telecommunication technologies, increasingly computers are being networked together. Companies are racing to put their businesses on public data networks, such as the Internet. Other non-profit and government entities are doing the same. Information has become readily available with a few mouse clicks. As a result, increasingly users go on-line to get their news, do their shopping, meet their friends or simply other users on-line.

Currently, under the prior art, a user can go to a pre-established on-line chat room (hereinafter, simply chat room), and chat with other users (acquainted or not). The chat rooms are typically organized by subject matters, such as movies, TV shows, health, family, social and political issues. These subject matter oriented chat rooms are hosted by an interest group, such as the video game players interest group, the romance book readers interest group, and so forth, or hosted by one of the portals, such as Yahoo and MSNBC. In addition to the pre-establishment and subject matter organization characteristics, prior art chat rooms also typically share a number of other common characteristics, the requirements of pre-registration and log-in, and scheduled chat times.

While prior art on-line chatting have provided users with a new venue for communicating and interacting with other users, the above discussed and other characteristics are confining. In the real world, people strike up conversation and chat with each other as they shop at their favorite department or "specialty" stores (video stores, music stores and so forth), or frequent their favorite establishments (coffee shops, restaurants, bars, art galleries, and so forth). While each store or establishment tends to draw patrons of particular demographics or interests, nevertheless, in each of these situations, people talk or chat about whatever topics that interest them at the moment. There is no need to pre-register to get a user-ID, set up a password, fill out a profile, log into a chat room at a scheduled time, and out of courtesy, fundamentally constrain one's conversation to expressions substantially related to the theme of the particular chat room.

Thus, a need exists to provide on-line users with enhanced chatting experience that is more closely related to their real world experience.

SUMMARY OF THE INVENTION

Visitation by a first on-line user to an information page of an information site is facilitated. Dynamic formation of a chat session for the first on-line user and a second on-liner user to chat with each other is also facilitated. The chat session, through which the first and second on-line users chat with each other, is then facilitated. In one embodiment, the chat session including its dynamic formation are facilitated by the information site. In another embodiment, the chat session including its dynamic formation are facilitated by a third party chat server. In one embodiment, the second on-line user is also visiting the same information page. In another embodiment, the second on-line user is merely visiting the same information site. In yet another embodiment, the second on-line user is visiting another information site. In one embodiment, visit by the first on-line user to a new information page of another information site, during the chat session, is also facilitated. In another embodiment, coordinated visit by the second on-line user to the same new information page of the other information site, during the chat session, is also facilitated.

BRIEF DESCRIPTION OF DRAWINGS

The present invention will be described by way of exemplary embodiments, but not limitations, illustrated in the accompanying drawings in which like references denote similar elements, and in which:

FIGS. 6a–6b illustrate the operational flow of the "describe" script/applet, and its associated end-user interface, in accordance with one embodiment;

FIGS. 8a–8b illustrate the operational flow of current visitor manager and the current visitor list in accordance with one embodiment;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as scripts, applet, end-user interfaces, icons, and so forth, commonly employed by those skilled in the art to convey the substance of their work to others skilled in the art. Parts of the description will be presented in terms of operations performed by a computer system, using terms such as registering, notifying, sending, and so forth. As well understood by those skilled in the art, these quantities and operations take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
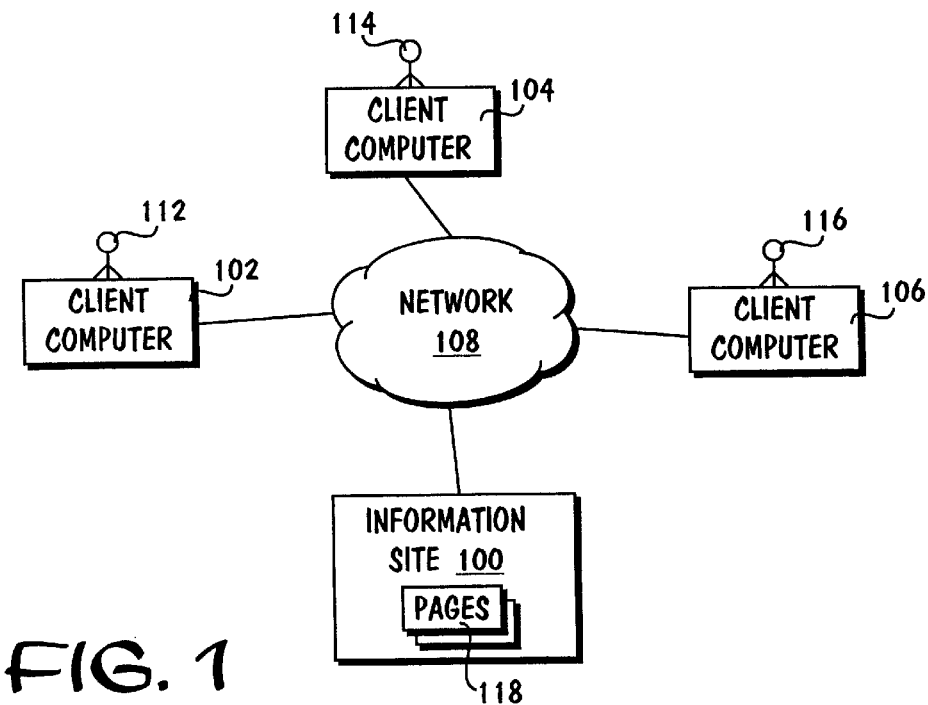
FIG. 1 illustrates an overview of the present invention, in accordance with one embodiment.

Referring now to FIG. 1, wherein a block diagram illustrating an overview of the present invention in accordance with one embodiment is shown. As illustrated, client computers 102, 104 and 106, and information site 100 are coupled to one another through network 108. Users 112, 114 and 116 using client computers 102, 104 and 106 visit information site 100, and peruse information pages 118, through network 108. In accordance with the present invention, information site 100 is equipped to enable a chat session to be dynamically formed on-demand between all or a subset of users 102, 104 and 106, through which they chat with each other. In accordance with the presently preferred embodiment, pre-registration by users 112, 114 and 116 with information site 100 as well as logging-in are unnecessary. Users 112, 114 and 116 are just any ordinary users visiting information site 100. As a result, the chatting experience of users 112, 114 and 116 is improved, as it more resembles what the users experience in real life. As will be readily apparent from the description to follow, while for ease of understanding, only users 112, 114 and 116 are illustrated, the present invention may be practiced with any number of users, limited only by the processing capacity and bandwidth of information site 100 and network 108.

Still referring to FIG. 1, network 108 is intended to represent a broad range of public and private data networks constituted with hubs, routers, switches, gateways and the like, known in the art. Suitable networking equipment (i.e. hubs, routers, and so forth) includes but not limited to those available from CISCO Systems and 3COM, both of San Jose, Calif. In one embodiment, network 108 is the well known Internet.

Similarly, except for the teachings of the present invention incorporated, information site 100 is intended to represent a broad range of data sources, business, education, entertainment and the like, constituted with a single or cluster of shared or dedicated computer servers. Suitable computer servers include but not limited to those available from IBM of Armonk, N.Y., and Sun Microsystems of Mountain View, Calif. Information pages 118 are intended to represent a broad range of textual and multi-media data embodied in any number of known organizational formats. In one embodiment, information site 100 is a web site, and information pages 118 are web pages.

Likewise, client computers 102, 104 and 106 are intended to represent a broad range of computers known in the art, of any one of a number of form factors, desktop, laptop, hand-held and the like, equipped with the proper communication or networking equipment, as well as operating systems and other software. Suitable client computers include but not limited to those available from Dell Computer of Austin, Tex., and Apple Computers of Cupertino, Calif. Communication/networking equipment includes but not limited to modems, ISDN, DSL as well as LAN adapters, available from 3Com and the like. Operating systems may be but not limited to the different variants of the Window® family of operating systems available from Microsoft of Redmond, Wash., Linux available from Red Hat of Durham, N.C., and OS/7 available from Apple Computer. Other software includes in particular a browser. Examples of suitable browsers include Internet Explorer and Navigator available from Microsoft and Netscape Communication of Mountain View, Calif. respectively.

Figure 2:
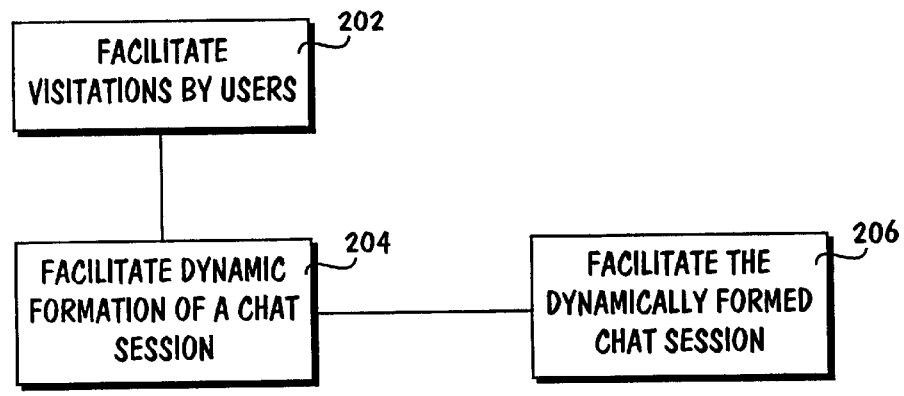
FIG. 2 illustrates a method of the present invention in accordance with one embodiment.

FIG. 2 illustrates a method of operation of the present invention, in accordance with one embodiment. As illustrated, at 202, visitations by users/client computers 102/112, 104/114, and 106/116 are facilitated by information site 100. In one embodiment, the facilitation is accomplished through intermittent connections made using a communication protocol. An example of such intermittent connections is a connection made in accordance with the hypertext transfer protocol (http), employing TCP/IP as the underlying communication protocol. At 204, while users/client computers 102/112, 104/114, and 106/116 are visiting information site 100, dynamic formation of a chat session between users 102–106, or a subset, is facilitated on demand by information site 100. At 206, upon formation of the chat session, chatting between users/client computers 102/112, 104/114, and 106/116 are facilitated by information site 100.

Figure 3:
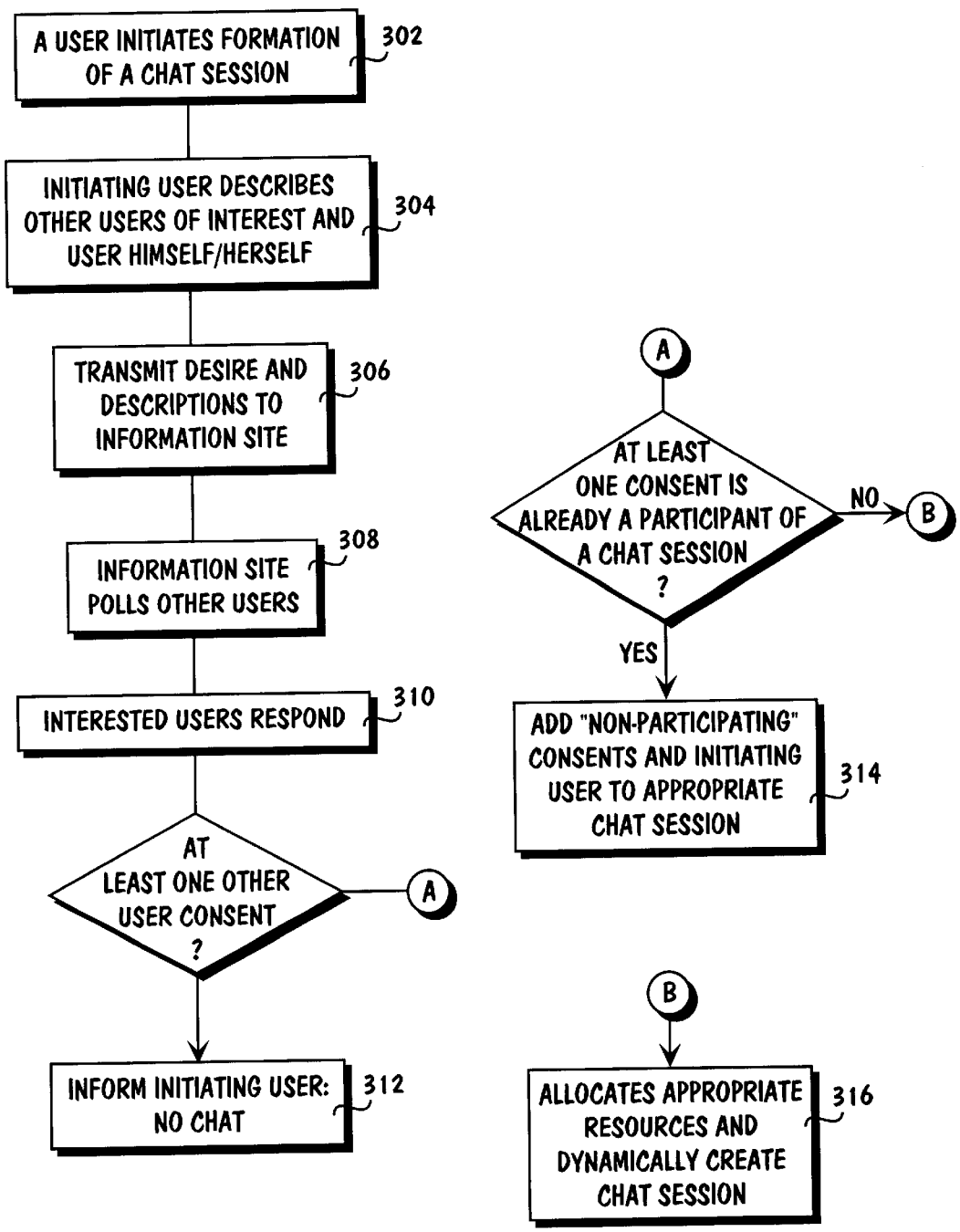
FIG. 3 illustrates the dynamic formation operation in further detail icon in accordance with one embodiment.

FIG. 3 illustrates the operation of dynamically forming a chat session on demand in further detail, in accordance with one embodiment. For the illustrated embodiment, it is assumed that users/client computers 102/112, 104/114, and 106/116 are all enabled to initiate the dynamic formation of the chat session. Furthermore, users/client computers 102/112,1041114, and 1061116 are enabled to describe the visiting users as well as himself/herself, when initiating the dynamic formation of the chat session. Moreover, information site 100 is equipped to know and poll all its current visitors. In alternate embodiments, the present invention may be practiced without all users/client computers 102/112,104/114, and 106/116 having the ability to initiate such dynamic formation of a chat session, e.g. certain "premier" users may be permitted to do so. The premier status may be "awarded" or given in any one of a number of application dependent manner. Likewise, in alternate embodiments, the present invention may be practiced without the initiating user/client computer having the ability to describe the other visiting users of interest, nor himself/herself, as well as without information site 100 having the ability to know and poll all current visitors.

At 302, one of visiting users initiates the dynamic formation of a chat session, by expressing his/her desire to chat with other visiting users. At 304, the initiating user describes the visiting users of interest to him/her, as well as how he/she wants to be presented to the other visiting users. At 306, the desire, including the various descriptions are sent from the initiating user's client computer to information site 100. At 308, information site 100 polls the other visiting users, informing them of the initiating user, and his/her interest to chat. In one embodiment, the polling includes visiting users who are already engaged in an earlier dynamically formed chat session. At 310, an interested one of the other visiting users responds to the polling, consenting to participate in such a chat session. In one embodiment, the responding user may be someone who's already participating in an earlier dynamically formed chat session. At 312, if no other visiting user consents to chat with the initiating user, the user is so informed. At 314, if at least some of the consenting users are already participating in an earlier dynamically formed chat session, the initiating user as well as the "non-participating" consenting users are added to an appropriate one of the earlier formed chat sessions. In one embodiment, the appropriate one of the earlier formed chat sessions is identified by prompting the initiating user, i.e. asking the initiating user to choose. In alternate embodiments, a tie breaking scheme, e.g. by weight and so forth, may be employed to automatically decide which earlier formed chat session is the appropriate chat session if chat participants of more than one chat session gave their consents. In yet other embodiments, all consenting users may be prompted for permission to merge their chat sessions to a single chat session, prior to adding the initiating user. At 316, if all consenting users are new chat participants, information site 100 allocates the appropriate resources (such as memory space and so forth), dynamically establishing the chat session for the initiating user and all other consenting users to chat with each other. In one embodiment, the resources required to facilitate chat session are pre-reserved.

Figure 4:
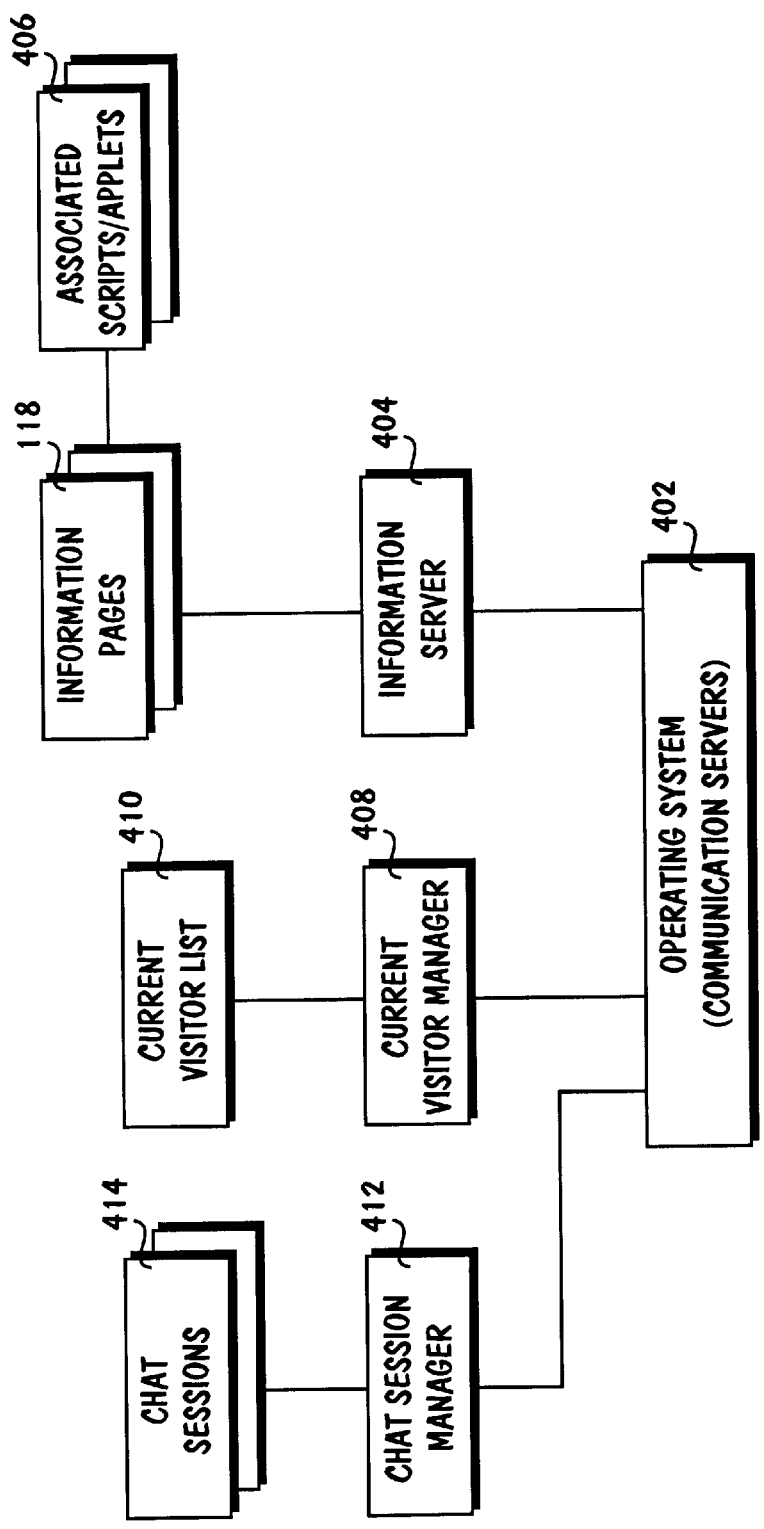
FIG. 4 illustrates a software view of an information site, in accordance with one embodiment.

FIG. 4 illustrates a software view of information site 100 in further detail in accordance with one embodiment. As illustrated, in addition to information pages 118, information site 100 includes operating system 402 and information server 404. Furthermore, information site 100 includes scripts/applets 406 associated with information pages 118, current visitor manager 408, current visitor list 410, chat session manager 412 and chat sessions 414.

Operating system 402 performs its conventional function of managing the hardware resource of information site 100. Operating system 402 includes in particular appropriate communication services for supporting network communication with client computers 112, 114 and 116. Examples of operating system 402 includes Window® NT available from Microsoft, or Solaris available from Sun Microsystems. Information server 404 performs is conventional function of responding to visiting users, and providing the visiting users with requested ones of information pages 118 (including applicable ones of associated scripts/applets 406). Examples of information server 404 includes Internet Information Server available from Microsoft, or Border Manager available from Novell of American Fork, Utah.

For the illustrated embodiment, scripts/applets 406 include in particular an "initiate", a "describe", and a "monitor/report" script/applet. The "initiate" script/applet is employed to provide a mechanism for a visiting user to indicate his/her desire to a chat session with selected ones of other visiting users. In a presently preferred embodiment, the "initiate" script/applet inserts a user selectable icon in the requested information page, and is provided to the user as an integral part of providing the responding information page. Moreover, for the embodiment, the user selectable icon has different manifestations corresponding to different visitation traffic levels at information site 100. In a presently preferred embodiment, a representative one of the manifestations is included with the "initiate" script/applet when it is provided to the user. In alternate embodiments, the "initiate" script/applet may further poll information site 100 periodically, to ensure the included manifestation remains representative, otherwise obtains a more representative manifestation. In yet other embodiments, other mechanisms for the user to indicate his/her desire to chat with other visiting users may be employed. The "describe" script/applet is employed to provide a mechanism for the initiating user to describe the visiting users of interest, as well as himself/herself. In one embodiment, the "describe" script/applet includes pre-selected demographic and other interest characteristics for the user to provide the description through a "selection" process. The "describe" script/applet is also provided to the user as an integral part of providing the responding information page. The "monitor/report" script is employed to monitor and report when a visiting user leaves information site 100 (to allow information site 100 to be able to determined the current visitors). The "monitor/report" script/applet is also provided to the user as an integral part of providing the responding information page. In alternate embodiments, the present invention may be practiced without the use of the "monitor/report" script/applet, using other approaches instead, such as timestamping a user's arrival and coupling the timestamping with automatic expiration of "currency" after a predetermined currency period. Scripts/applets 406 may be implemented using any one of a number of programming languages known in the art, including but not limited to Java, Java Script, and the like. One embodiment each of an example implementation of these scripts/applets will be described later referencing FIGS. 5a–5b, 6a–6b, and 7.

Current visitor manager 408 and current visitor list 410 are employed to track current visitors, and information associated with the current visitors. The information includes in particular network addresses of the visiting users' client computers. Current visitor manager 408 creates a record in current visitor list 410 for each new visiting user, and deletes the visitation record when the visiting user leaves information site 100. Chat session manager 412 is employed to create, on demand, chat sessions 414, and thereafter, facilitate them until their terminations (including merging if applicable). Chat session manager 412 is also responsible for terminating a chat session 414 after all chat participants have left the chat session. Current visitor manager 408 and chat session manager 412 may be implemented using any one of a number of programming languages known in the art, including but not limited to C, C++, and the like, whereas current visitor list 410 and chat session 414 may be implemented using any one of a number of data structures known in the art. One embodiment each of an example implementation of current visitor manager 408, current visitor list 410, chat session manager 412 and chat sessions 414 will be described later referencing FIGS. 8a–8b, and 9a–9b.

Figure 5A:
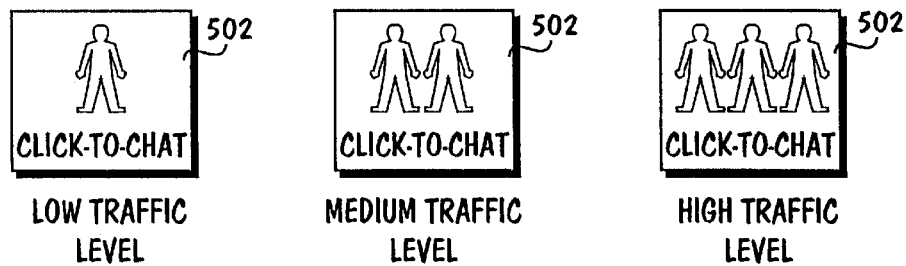
FIGS. 5a–5b illustrate the operational flow of the "initiate" script/applet, and its associated end-user interface, in accordance with one embodiment.
Figure 5B:
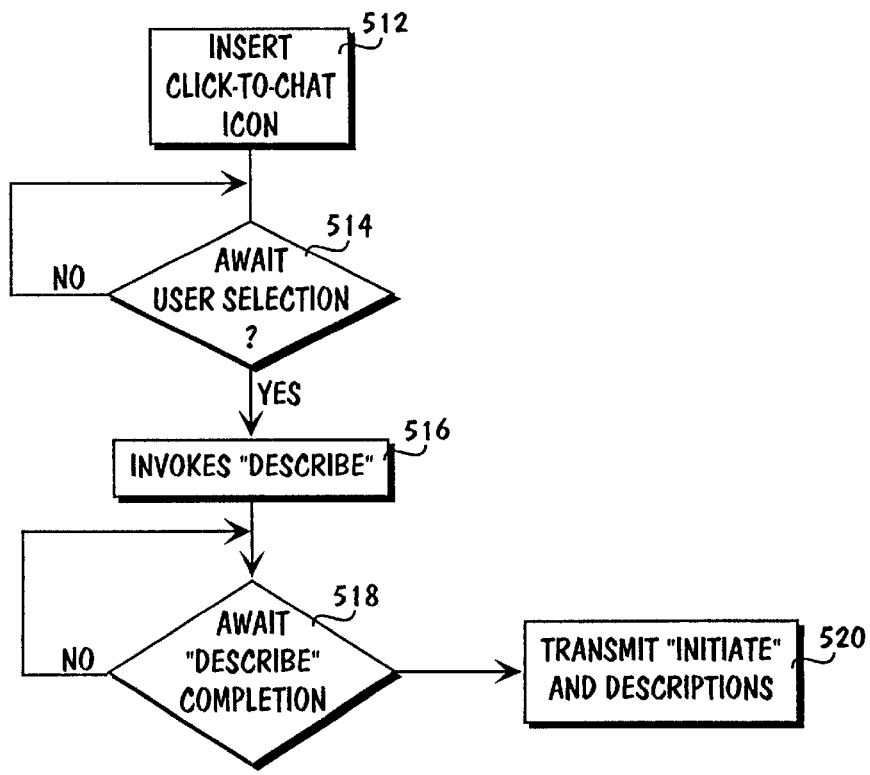

Referring now to FIGS. 5a–5b, wherein two block diagrams illustrating the operational flow of the "initiate" script/applet, and its associated end-user interface, in accordance with one embodiment, are shown. As illustrated, at 512, upon receipt at one of client computers 102/1041106, the "initiate" script/applet (through operating system display services) inserts user selectable icon 502 in the requested information page, and registers with the appropriate operating system services for notification if the icon is selected. At 514, the "initiate" script/applet awaits user selection. At 516, in response to a selection notification, the "initiate" script/applet invokes the "describe" script/applet. At 518, the "initiate" script/applet awaits completion of the description (other visiting users, as well as the initiating user himself/herself). At 520, in response to a completion indication, the "initiate" script/applet transmits its selection along with the descriptions to information site 100.

Figure 6A:
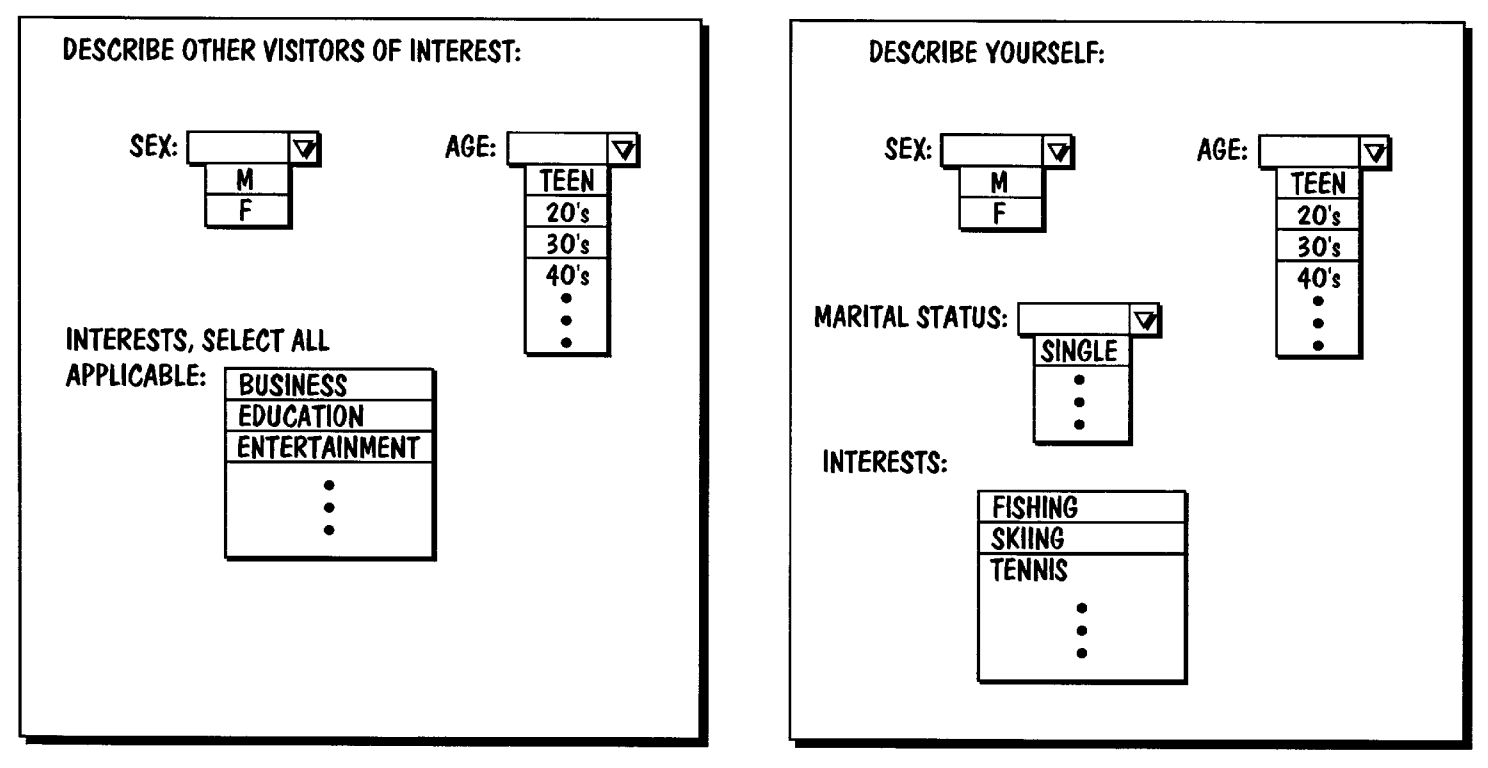
Figure 6B:
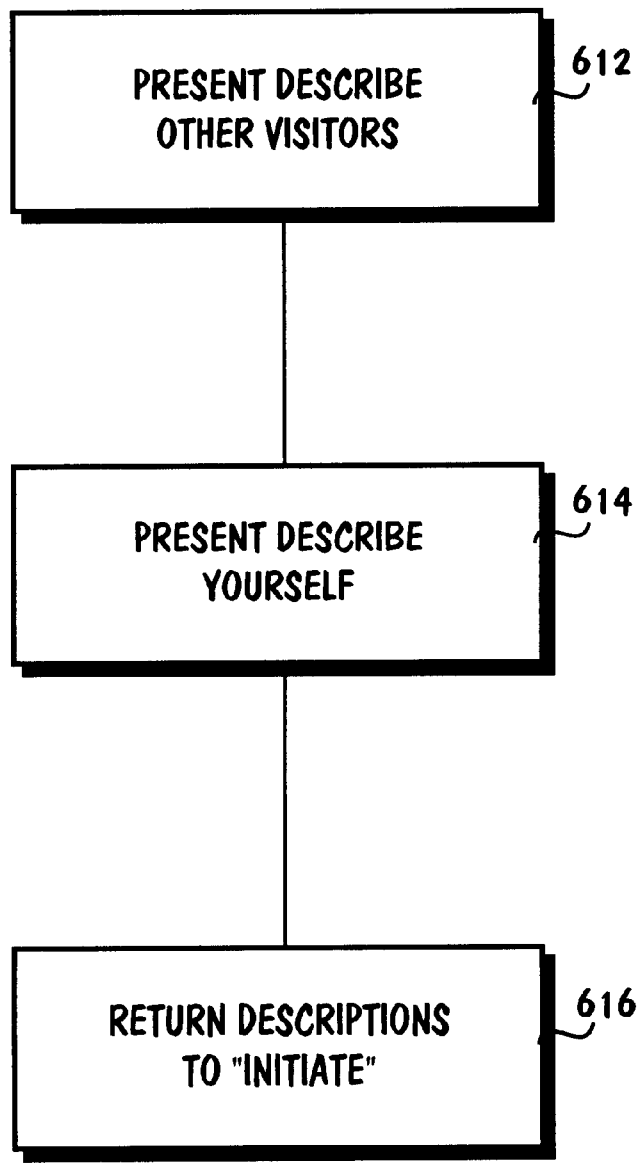

Referring now to FIGS. 6a–6b, wherein two block diagrams illustrating the operational flow of the "describe" script/applet, and its associated end-user interface, in accordance with one embodiment, are shown. As illustrated, at 612, upon invocation, the "describe" script/applet (through operating system display services) presents "other visiting users" description dialog 602 for the initiating user to describe the other visiting users with whom the initiating user is interested in chatting. As shown, for the illustrated embodiment, "other visiting users" description dialog 602 includes a number of "drop down" lists for the initiating user to specify a number of demographic and interest characteristics. In alternate embodiments, other approaches, e.g. free form, for the initiating user to describe the other visiting users with whom he/she is interested in chatting with may be employed instead.

Upon completion, at 614, the "describe" script/applet (through operating system display services) presents "initiating user" description dialog 604 for the initiating user to describe how he/she wants himself to be presented to the other visiting users. As shown, for the illustrated embodiment, "initiating user" description dialog 604 also includes a number of "drop down" lists for the initiating user to specify a number of demographic and interest characteristics. In like manner, in alternate embodiments, other approaches, e.g. free form, for the initiating user to describe himself/herself may be employed instead.

Upon completion, at 616, the "describe" script/applet returns the descriptions collected to the "initiate" script/applet. In some implementations, the descriptions may be effectively returned by return a pointer to the description data to the "initiate" script/applet.

Figure 7:
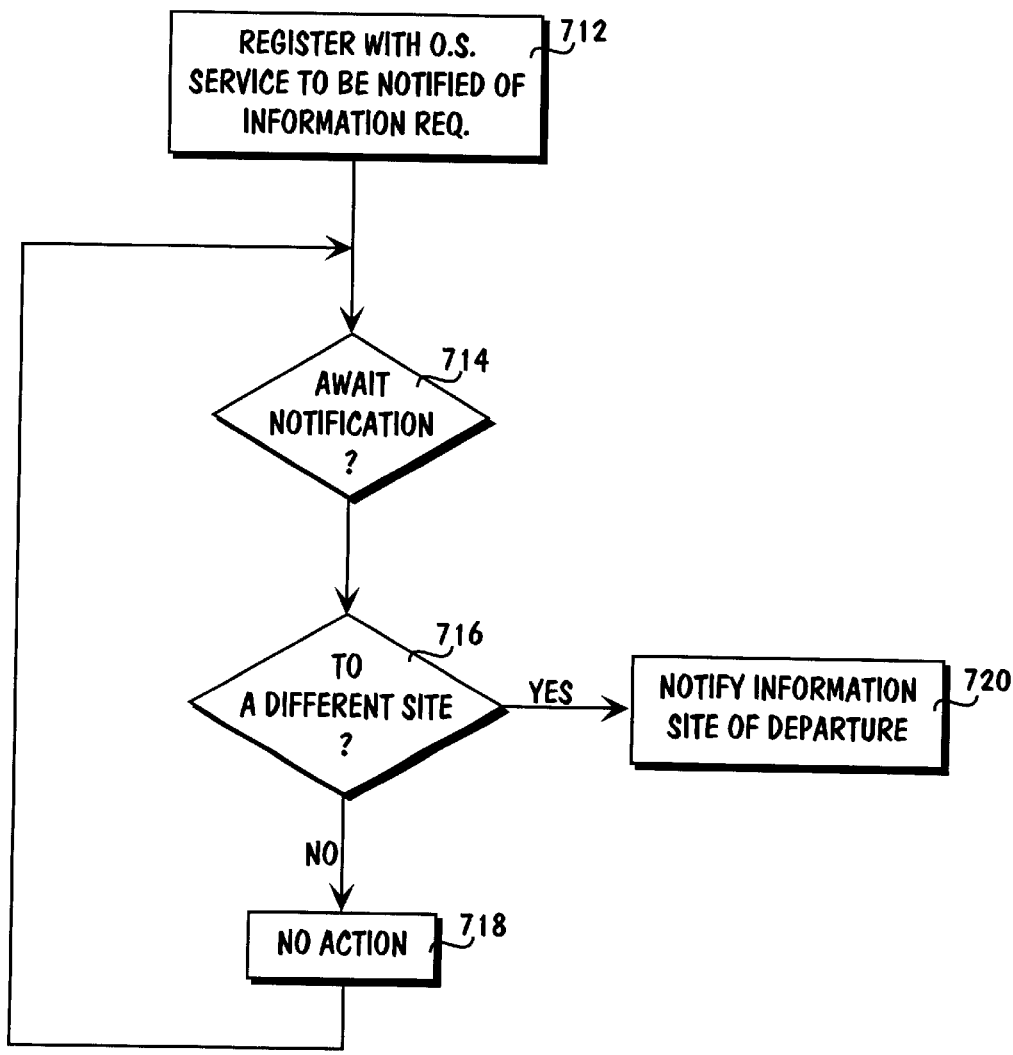
FIG. 7 illustrates the operational flow of the "monitor/report" script/applet, in accordance with one embodiment.

Referring now to FIG. 7, wherein a block diagram illustrating the operational flow of the "monitor/report" script/applet, in accordance with one embodiment, is shown. As illustrated, at 712, upon receipt at one of client computers 102/104/106, the "monitor/report" script/applet registers with the appropriate operating system services, such that it will informed about all subsequent information page requests made by client computer 102/104/106. At 714, the "monitor/report" script/applet awaits for such notifications. At 716, upon receipt of one such notification, the "monitor/report" script/applet determines if the request takes the user/client computer to a different information site. If not, the "monitor/report" script/applet takes no action, and returns to 714 to await the next notification, 718. On the other hand, if the request does take the user/client computer away from information site 100, the "monitor/report" script/applet reports the departure to current visitor manager 408, 720.

Referring now to FIGS. 8a–8b, wherein two block diagrams illustrating the operational flow of current visitor manager 408 and current visitor list 410, in accordance with one embodiment, are shown. As illustrated, at 812, upon start-up, current visitor manager 408 registers with the appropriate operating system services, such that it will be informed about all information page requests received by information server 118. At 814, current visitor manager 408 awaits for such notifications as well as notifications from the above described "monitor/report" script/applet that certain visiting users have left information site 100. At 816, upon receipt of one such notifications, current visitor manager 408 determines if the notification is about an information page request or about the departure of a current visiting user.

If it is about an information page request, current visitor manager 408 determines if the request is being made by a new visiting user, 818. In one embodiment, the determination is made by examining the network address of the requesting client computer, against the network addresses of the current visiting users. If a match is found, current visitor manager 408 takes no action, and continues at 814. On the other hand, if the request is made by a new visiting user, current visitor manager 408 creates a new current visitor record in current visitor list 410, including at least the current visitor's network address, 820. In alternate embodiments, additional information may also be collected and kept about the current visitors, and continues at 814.

Back at 816, if the notification is about the departure of a current visiting user, current visitor manager 408 deletes the corresponding current visitor record of the departed visiting user from current visitor list 410, 822. Upon deletion, current visitor manager 408 continues at 814.

Figure 9A:
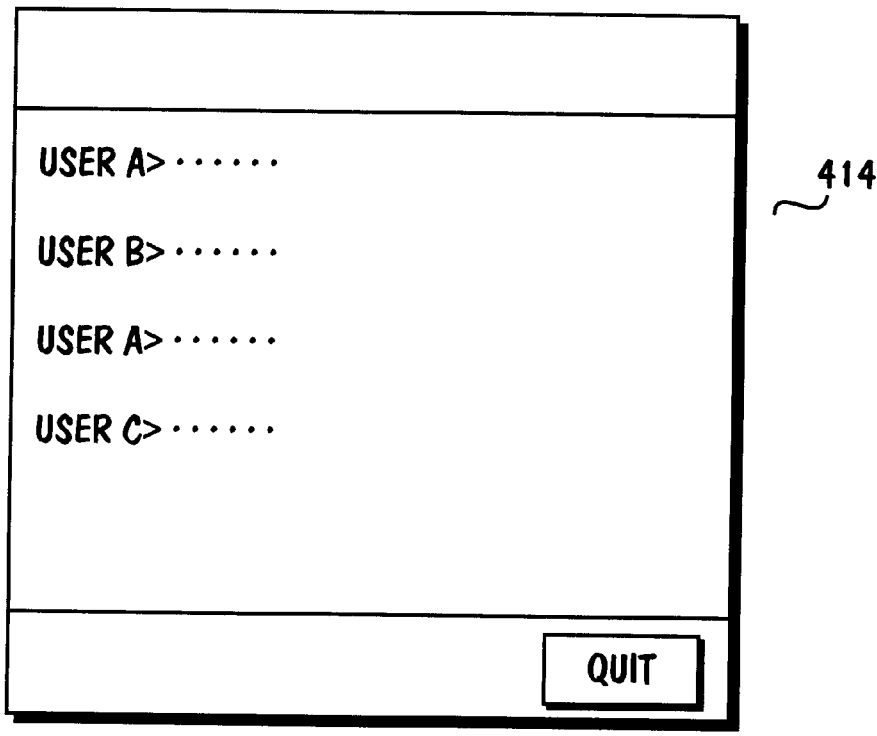
FIGS. 9a–9b illustrate the operational flow of chat session manager and the end user interface of a chat session in accordance with one embodiment.
Figure 9B:
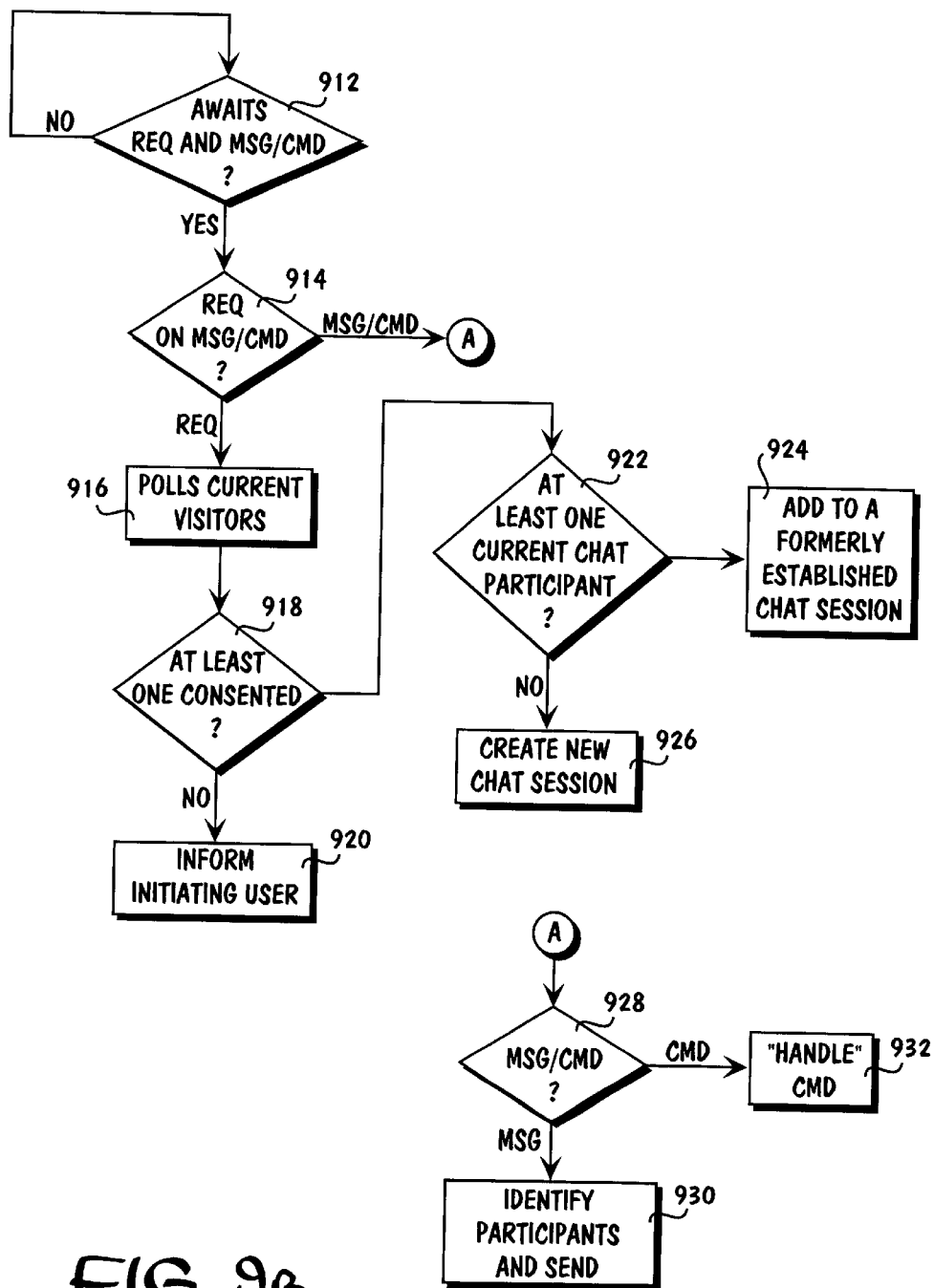

Referring now to FIGS. 9a–9b, wherein two block diagrams illustrating the operational flow of chat session manager 412, and the end-user interface of a chat session 414, in accordance with one embodiment, are shown. As illustrated, at 912, upon start-up, chat session manager 412 awaits requests from the "initiate" scripts/applets and chat messages/commands from a chat session participant. It should be noted that chat messages may be text, voice, or multi-media (although only text is illustrated in FIG. 9a). At 914, chat session manager 412 determines if the received item is a request or a message/command.

Upon receipt of an "initiate" request, at 916, chat session manager 412 polls all other current visitors, presenting them with the descriptions describing the initiating user as well as his/her interest. In one embodiment, chat session manager 412 polls current visitors who are already participating in an earlier formed chat session by posting the question through the chat session. At 918, upon expiration of a predetermined reply interval, chat session manager 412 determines if at least one current visitor has consented to chat with the initiating user. If none has consented, chat session manager 412 informs the initiating user accordingly, 920. If at least one consent is a current chat participant, chat session manager 412 adds the initiating user to an appropriate one of the earlier formed chat sessions, 924. As described earlier, if the consent users are already participants of multiple chat sessions, the initiating user may be prompted to select which one he/she wants to join; alternatively, the consenting users may be prompted for merging the chat sessions. Also, a tie breaking scheme, e.g. by weight and so forth, may also be employed instead to automatically decide which earlier formed chat session is the appropriate chat session if chat participants of more than one chat session gave their consents. If at least one other visiting user consented, but none are current chat participants, chat session manager 412 allocates the appropriate resources (memory space, etc.) and dynamically forms a chat session for the initiating and consenting users, 926. Chat session manager 408 keeps tracks of all the chat sessions and their participants.

Upon receipt of a chat message/command from a participant of a chat session, at 928, chat session manager 412 determines if it is a message or command. If it is a message, at 930, chat session manager 412 identifies all other participants of the chat session, and sends the chat message to the identified participants, as in prior art. Similarly, if it is a command, e.g. "quit", at 932 chat session manager 412 handles them accordingly, as in prior art. In particular, if it is a "quit" command, and the transmitting participant is the last participant, chat session manager 412 terminates the chat session.

Thus, it can seen from the above description, under the present invention, a user may enjoy improved chat experience that is more closer to his/her real life experience. The user may freely strike up conversations with other users of interest at any information site, as he/she "cruises" on the "information superhighway". The user is not limited to pre-formed chat sessions that the user has pre-registered, and chatting only at schedule times, which may or may not be convenient for the user.

Figure 10:
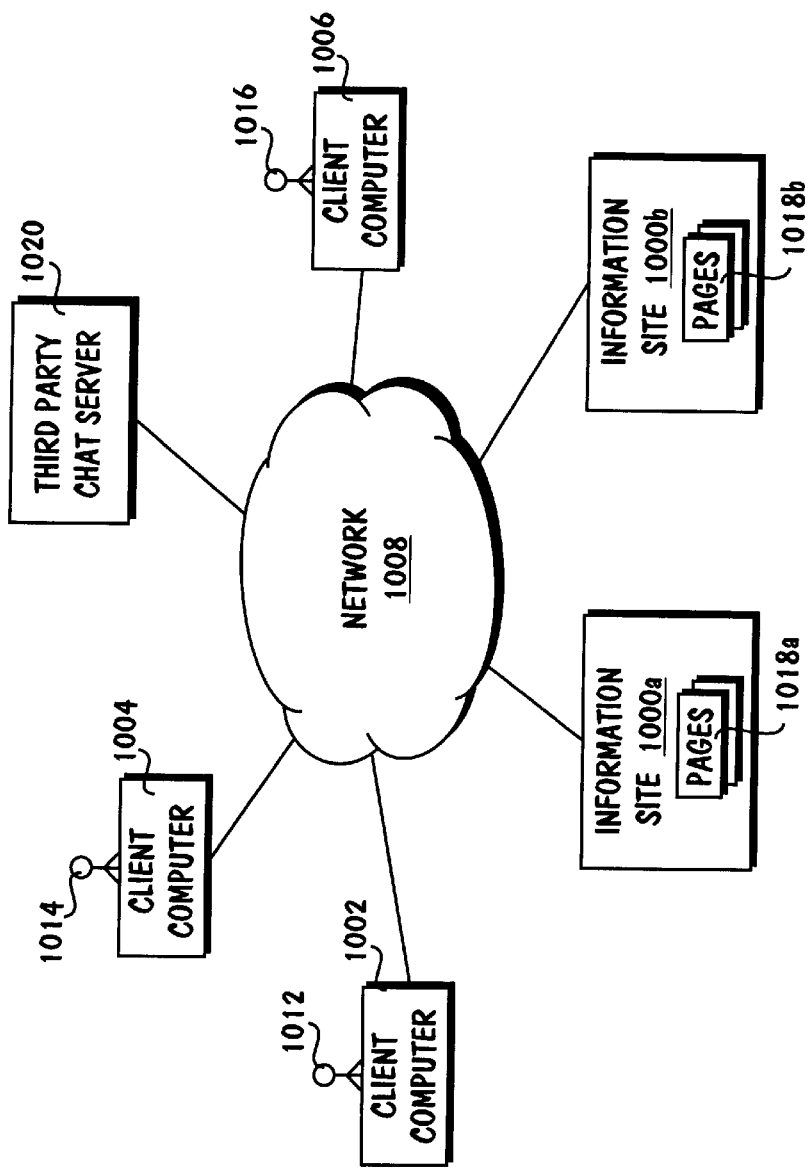
FIG. 10 illustrate an overview of the present invention, in accordance with another embodiment.

Referring now to FIG. 10, wherein a block diagram illustrating an overview of the present invention in accordance with another embodiment is shown. Similar to the embodiment of FIG. 1, client computers 1002, 1004 and 1006, and information sites 1000a and 1000b are coupled to one another through network 1008. Users 1012, 1014 and 1016 using client computers 1002, 1004 and 1006 visit information site 1000a and/or 1000b, and peruse information pages 1018a and/or 1018b, through network 1008. However, unlike the embodiment of FIG. 1, thirty party chat server 1020 is also coupled to the above enumerated elements through network 1008. It is third party chat server 1020 that is equipped with the "primary" elements to enable a chat session to be dynamically formed on-demand between all or a subset of users 1002, 1004 and 1006, through which they chat with each other.

In other words, third party chat server 1020 is equipped with the equivalents of the earlier described current visitor manager, current visitor list, chat session manager and chat sessions, performing the same functions (except it is on behalf of the visitors of information sites 1000a–1000b) as described earlier. In one embodiment, the polling is limited to "related" sites only. What constitutes "related" is application dependent, and may be established in accordance with any policies or heuristics.

For the illustrated embodiment, information sites 1000a–1000b are continued to be equipped with the operating system, the information server, the information pages, and the equivalents of the associated scripts/applets, in particular, equivalents of the "initiate", "describe" and "monitor/report" scripts/applets, performing the same functions as described earlier. Except in this embodiment, each information sites 1000a/1000b is further equipped with a notification function for information site 1000a/1000b to notify third party chat server 1020 of its visitors. Furthermore, the "initiate" script/applet is designed to transmit the initiation request along with the descriptions to third party chat server 1020 instead. Similarly, the "monitor/report" script/applet is designed to transmit the departure notification to third party chat server 1020 instead.

In an alternate embodiment, client computers 1002–1004 are pre-provided (e.g. by third party chat server 1020) with equivalents of the "initiate", "describe" and "monitor/report" scripts/applets, performing the same functions as described earlier. Except in this embodiment, in addition to departure, "monitor/report" also reports to third party chat server 1020 which information site the user is visiting, as the user arrives at the site. In like manners, the "initiate", "describe" and "monitor/report" scripts/applets are all designed to transmit their data to third party chat server 1020.

As with the embodiment of FIG. 1, in a presently preferred variation of this embodiment, pre-registration by users 1012, 1014 and 1016 as well as logging-in are unnecessary. Users 1012, 1014 and 1016 are just any ordinary users visiting information sites 1000a and/or 1000b. As a result, the chatting experience of users 1012, 1014 and 1016 is even further improved, as in addition to being able to chat with visiting users of the same information site, users 1012, 1014 and 1016 may be able to chat with visiting users of a "community" of sites (however, community may be defined in an application dependent manner), and yet the chatting may be accomplished independent of the "community" of sites, i.e. without their participation. Note that under this embodiment, users 1012, 1014 and 1016 may even be chatting with each other, as they move from site to site among the "community" of sites. The coordinated movement among the sites may be effectuated by simply notifying each other through the chat sessions, or through additional scripts/applets, automatically "stuffing" the new site destination into e.g. the browser of each user's client computer.

Similar to the embodiment of FIG. 1, it should be noted that while for ease of understanding, only users 1012, 1014 and 1016, information sites 1000a–100b, and third party chat server 1020 are illustrated, the present invention may be practiced with any number of users, information sites, and third party chat servers, limited only by the processing capacity and bandwidth of these elements and network 1008.

Thus, methods and apparatuses for facilitating a novel approach to on-line chatting have been described. While the present invention has been described in terms of the above illustrated embodiments, those skilled in the art will recognize that the invention is not limited to the embodiments described. The present invention can be practiced with modification and alteration within the spirit and scope of the appended claims. For example, the present invention may also be practiced with additional features such as a "friends list" similar to the "friend list" feature known in the art of instant messaging. The description is thus to be regarded as illustrative instead of restrictive on the present invention.

What is claimed is:

1. An on-line chatting method comprising:
   facilitating visit by a first on-line user to an information page of an information site;
   facilitating dynamic formation of a chat session unaffiliated with any pre-established chat room for said first on-line user and a second on-line user to chat with each other; and
   facilitating said chat session through which said first and second on-line users chat with each other.

2. The method of claim 1, wherein said facilitating of dynamic formation of a chat session unaffiliated with any pre-established chat room comprises providing a mechanism to said first on-line user to initiate formation of said unaffiliated chat session.

3. The method of claim 2, wherein said provision of a mechanism to said first on-line user to initiate formation of said unaffiliated chat session comprises providing a selectable icon for said first on-line user to indicate the first on-line user's desire to chat with another non-particularized on-line user.

4. The method of claim 3, wherein said provision of a mechanism to said first on-line user to initiate formation of said unaffiliated chat session further comprises providing one or more dialog panels for said first on-line user to specific one or more descriptive characteristics of said first on-line user.

5. The method of claim 4, wherein the one or more descriptive characteristics include descriptive characteristic (s) selected from a group of descriptive characteristics consisting of a demographic characteristic and an interest characteristic.

6. The method of claim 3, wherein said provision of a mechanism to said first on-line user to initiate formation of said unaffiliated chat session further comprises providing one or more dialog panels for said first on-line user to specific one or more descriptive characteristics of said other non-particularized on-line user.

7. The method of claim 6, wherein the one or more descriptive characteristics include descriptive characteristic(s) selected from a group of descriptive characteristics consisting of a visit destination characteristic, a demographic characteristic, and an interest characteristic.

8. The method of claim 3, wherein said provision of a selectable icon comprises providing an icon in one of a selected one of a plurality of manifestations corresponding to a plurality of current visitation traffic levels of a selected one of said information site and said information page.

9. The method of claim 1, wherein said facilitating of dynamic formation of an unaffiliated chat session comprises inquiring a plurality of other on-line users, including said second on-line user, to determine if any of said other on-line users is interested in chatting with said first on-line user.

10. The method of claim 1, wherein said facilitating of dynamic formation of an unaffiliated chat session comprises asking the firs t on-line user to select an unaffiliated chat session from a plurality of previously dynamically formed unaffiliated chat sessions being participated by a plurality of other on-line users consenting to chat with the first on-line user, including said second on-line user.

11. The method of claim 1, wherein said facilitating of dynamic formation of an unaffiliated chat session comprises asking a plurality of other on-line users consenting to chat with the first on-line user to consent to merge previously dynamically formed chat sessions the consenting other on-line users are participating.

12. The method of claim 1, wherein said facilitating of dynamic formation of an unaffiliated chat session comprises applying a tie breaking scheme to automatically select a chat session from a plurality of previously dynamically formed chat sessions being participated by a plurality of other on-line users consenting to chat with the first on-line user, including said second on-line user.

13. The method of claim 1, wherein said facilitating of dynamic formation of an unaffiliated chat session comprises maintaining visitation status records of said first and second on-line users.

14. The method of claim 1, wherein said facilitating of visit by said first on-line user to an information page of an information site comprises providing a mechanism to facilitate detection of said first on-line user leaving said information site.

15. The method of claim 1, wherein said facilitating of visit by said first on-line user to an information page of an information site comprises informing a chat server of said first on-line user's visit to said information site.

16. The method of claim 1, wherein said second on-line user is also visiting at least said information site.

17. The method of claim 1, wherein said method further comprises facilitating visit by said first on-line user to an information page of another information site, while continuing to facilitate said chat session.

18. The method of claim 17, wherein said method further comprises facilitating visit by said second on-line user to the same information page of said other information site, while continuing to facilitate said chat session.

19. An information server comprising:
a plurality of information pages to be selectively provided to a client computer responsive to the client computer's request; and
a first script/applet to be included with a responsive information page to enable the client computer to initiate dynamic formation of a chat session unaffiliated with any pre-established chat room for a user of the client computer to chat with a second user of interest, also visiting the information server.

20. The information server of claim 19, wherein said information server further comprises a second script/applet to be included with the responsive information page to enable the user of the client computer to describe a selected one of the user himself/herself and other users of interest.

21. The information server of claim 19, wherein said information server further comprises a second script/applet to be included with the responsive information page to enable the client computer to monitor and report the user leaving the information server.

22. The information server of claim 19, wherein said information server further comprises a current visitor manager to maintain a list of current visitors of the information server.

23. The information server of claim 19, wherein said information server further comprises a chat session manager to dynamically form and maintain said unaffiliated chat session.

24. A client computer comprising:
a first script/applet to enable the client computer to monitor and report to a third party chat server visits by the client computer to information servers;
a second script/applet to enable the client computer to initiate dynamic formation of a chat session unaffiliated with any pre-established chat rooms for a user of the client computer to chat with a second user of interest visiting one of the information servers.

25. The client computer of claim 24, wherein said client computer further comprises a third script/applet to enable the user of the client computer to describe a selected on of the user himself/herself and other users of interest.

* * * * *